(12) United States Patent
Gopalan

(10) Patent No.: US 9,587,410 B2
(45) Date of Patent: *Mar. 7, 2017

(54) POOL CLEANER DEBRIS BAG

(75) Inventor: Suresh Cherulassery Gopalan, Cary, NC (US)

(73) Assignee: Pentair Water Pool and Spa, Inc., Cary, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/510,917

(22) Filed: Jul. 28, 2009

(65) Prior Publication Data
US 2009/0301955 A1     Dec. 10, 2009

(51) Int. Cl.
*B01D 29/27* (2006.01)
*B01D 29/23* (2006.01)
*E04H 4/16* (2006.01)

(52) U.S. Cl.
CPC ........... *E04H 4/1654* (2013.01); *B01D 29/23* (2013.01); *B01D 29/27* (2013.01); *Y10T 24/15* (2015.01)

(58) Field of Classification Search
CPC ........ E04H 4/1636; B01D 29/23; B01D 29/27
USPC .... 210/496, 167.17, 172.5, 232, 416.2, 445; 210/453, 121, 167.18, 167.1, 242.1; 15/1.7; 248/95; 55/361, 369, 373, 378
See application file for complete search history.

(56) References Cited

U.S. PATENT DOCUMENTS

| | | | |
|---|---|---|---|
| 1,184,485 A | 5/1916 | Mummert | |
| 1,302,886 A | 5/1919 | Wagner | |
| 1,383,615 A * | 7/1921 | Geier | 55/368 |
| 1,422,105 A | 7/1922 | Kirby | |
| 1,444,165 A | 2/1923 | Clements | |
| 1,553,076 A | 9/1925 | Halsted | |
| 1,827,496 A | 10/1931 | Bert | |
| 1,923,299 A | 8/1933 | Darling | |
| 1,970,190 A | 8/1934 | Riebel, Jr. | |
| 2,003,720 A * | 6/1935 | Meek | 55/370 |
| 2,024,143 A | 12/1935 | Cameron | |
| 2,047,735 A | 7/1936 | Hunsdorf | |
| 2,421,067 A * | 5/1947 | Howe | 383/92 |
| 2,528,332 A | 10/1950 | Bergquist | |
| 2,637,409 A | 5/1953 | Tuner et al. | |

(Continued)

FOREIGN PATENT DOCUMENTS

| | | |
|---|---|---|
| AU | 17035/34 | 4/1935 |
| AU | 2005204246 A1 | 3/2006 |

(Continued)

*Primary Examiner* — Benjamin Kurtz
(74) *Attorney, Agent, or Firm* — Quarles & Brady LLP

(57) ABSTRACT

A pool cleaner debris bag is provided having an open end adapted to receive debris from the pool and a closable end defining at least one discharge passage for the bag. The pool cleaner further comprises a securing apparatus disposed along at least a portion of the closable end. For example, the securing apparatus can have at least two separable members selectively movable between an unsecured position to permit opening of the discharge passage, and a secured position having at least a portion of the first end is disposed between the at least two separable members to permit closing of the discharge passage. In addition or alternatively, the debris bag can comprise a seam disposed at a location spaced apart from the open end for defining at least one discharge passage for the bag. In addition or alternatively, the securing apparatus can comprise a clasp.

8 Claims, 7 Drawing Sheets

(56) References Cited

U.S. PATENT DOCUMENTS

| | | | |
|---|---|---|---|
| 2,705,054 A * | 3/1955 | Swann | A47L 9/14 55/370 |
| 3,297,152 A | 1/1967 | Corella et al. | |
| 3,367,485 A | 2/1968 | Schneider et al. | |
| 3,426,510 A | 2/1969 | Shaaf | |
| 3,542,206 A | 11/1970 | Gelster | |
| 3,912,140 A * | 10/1975 | Franges | 294/166 |
| 4,575,423 A | 3/1986 | Alanis et al. | |
| 4,618,420 A | 10/1986 | Alanis | |
| 4,649,589 A | 3/1987 | Dibb | |
| 4,675,032 A | 6/1987 | Genovese | |
| 4,856,913 A | 8/1989 | Campbell | |
| 4,880,531 A | 11/1989 | Blake | |
| 5,240,484 A | 8/1993 | Genovese | |
| 5,370,597 A | 12/1994 | Genovese | |
| 5,450,644 A | 9/1995 | Berman | |
| 5,771,532 A | 6/1998 | Munnoch | |
| 5,813,092 A * | 9/1998 | Greenfield et al. | 16/425 |
| 5,863,425 A | 1/1999 | Herlehy et al. | |
| D429,393 S | 8/2000 | Rief | |
| 6,131,227 A | 10/2000 | Rief | |
| 6,241,899 B1 | 6/2001 | Ramos | |
| 6,292,970 B1 | 9/2001 | Rief | |
| 6,706,175 B1 | 3/2004 | Rief et al. | |
| 6,740,233 B2 | 5/2004 | Stoltz et al. | |
| 6,782,578 B1 | 8/2004 | Rief | |
| 6,802,879 B2 * | 10/2004 | Scanlon | 55/367 |
| 6,802,963 B2 * | 10/2004 | Campbell | 210/167.2 |
| 6,854,148 B1 | 2/2005 | Rief | |
| 6,908,550 B2 | 6/2005 | Silverstein | |
| 7,507,332 B2 * | 3/2009 | Henkin | B01D 29/27 15/1.7 |
| 7,575,675 B2 * | 8/2009 | Gopalan | 210/167.1 |
| 2005/0029177 A1 * | 2/2005 | Peterson et al. | 210/169 |
| 2005/0040089 A1 | 2/2005 | Meritt-Powell | |
| 2005/0236310 A1 | 10/2005 | Meritt-Powell | |
| 2005/0279682 A1 | 12/2005 | Davidson et al. | |
| 2012/0152316 A1 | 6/2012 | Fischer et al. | |
| 2013/0152316 A1 | 6/2013 | Rief | |
| 2014/0042063 A1 | 2/2014 | Rief | |

FOREIGN PATENT DOCUMENTS

| | | |
|---|---|---|
| AU | 2006233248 B2 | 5/2007 |
| AU | 2006235806 B2 | 5/2007 |
| AU | 2005239668 A1 | 6/2007 |
| AU | 2007261424 B2 | 12/2007 |
| AU | 2007261425 B2 | 12/2007 |
| AU | 2006350955 B2 | 5/2008 |
| AU | 2007332716 B2 | 6/2008 |
| AU | 2007332769 B2 | 6/2008 |
| AU | 2007244852 B2 | 11/2008 |
| AU | 2008319307 A1 | 5/2009 |
| AU | 2011244897 A1 | 5/2012 |
| AU | 2012203886 A1 | 7/2012 |
| AU | 2012244365 A1 | 11/2012 |
| AU | 2013204976 A1 | 5/2013 |
| AU | 2013200894 A1 | 9/2013 |
| AU | 2012258346 A1 | 12/2013 |
| AU | 2013266997 A1 | 1/2014 |
| AU | 2014202995 A1 | 6/2014 |
| AU | 2014202996 A1 | 6/2014 |
| AU | 2014208211 A1 | 8/2014 |
| AU | 2014218432 A1 | 3/2015 |
| WO | 00/21639 A1 | 4/2000 |
| WO | WO/2005/019565 | 3/2005 |
| WO | 2009/052412 A1 | 4/2009 |
| WO | 2009/005297 A3 | 5/2009 |
| WO | 2009/146479 A1 | 12/2009 |
| WO | 2010/042406 A1 | 4/2010 |
| WO | 2010/088619 A1 | 8/2010 |
| WO | 2011/041444 A1 | 4/2011 |
| WO | 2011/063463 A1 | 6/2011 |
| WO | 2011/088493 A1 | 7/2011 |
| WO | 2012/037435 A3 | 3/2012 |
| WO | 2013/052351 A1 | 4/2013 |
| WO | 2013/052352 A1 | 4/2013 |
| WO | 2013/052356 A1 | 4/2013 |
| WO | 2013/057479 A3 | 4/2013 |
| WO | WO2013/067206 A1 | 5/2013 |
| ZA | 1986/06841 | 9/1986 |
| ZA | 1989/01785 | 11/1989 |
| ZA | 1995/09103 | 10/1995 |
| ZA | 1995/09993 | 5/1996 |
| ZA | 1996/05947 | 3/1997 |
| ZA | 1998/06933 | 4/1999 |
| ZA | 1999/7765 | 6/2000 |
| ZA | 2001/00202 | 1/2001 |

* cited by examiner

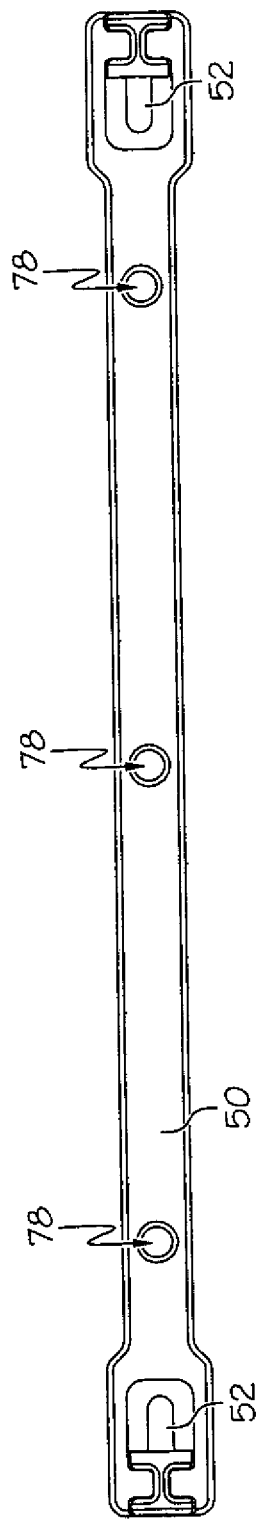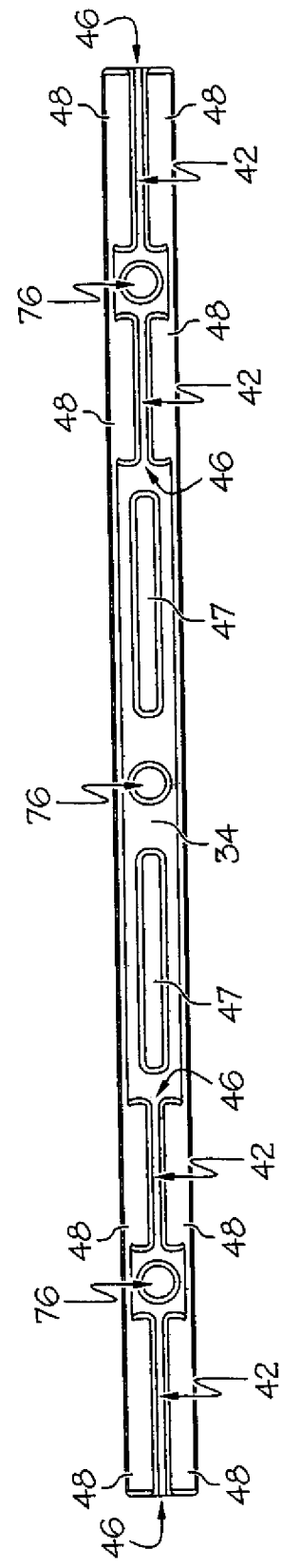

POOL CLEANER DEBRIS BAG

RELATED APPLICATIONS

This application claims priority to U.S. application Ser. No. 11/455,404 filed on Jun. 19, 2006, the entire contents of which is incorporated herein by reference.

FIELD OF THE INVENTION

The present invention relates generally to automatic swimming pool cleaners, and in particular to a bag designed to collect refuse and debris from the pool cleaner.

BACKGROUND OF THE INVENTION

Automatic swimming pool cleaners for cleaning the floor and sidewalls of a swimming pool are well known. There are many types of pool cleaners in the pool cleaning market, such as pressure or return side cleaners, suction cleaners, electric cleaners, and in-floor cleaners. The pool cleaners can be submerged and can move along the pool floor and sidewalls. Additionally, the pool cleaners must be able to withstand harsh chemicals often found in swimming pool water, such as chlorine, bromine, ozone, or the like.

Some pool cleaners, such as pressure or return side cleaners, can use a debris bag to collect debris in the pool. For example, water from a pump can be fed into the cleaner to sweep and collect debris into the bag carried by the cleaner. Eventually, the debris collected by the pool cleaner needs to be removed from the debris bag. It is known to include a seam with the debris bag to permit the debris to be removed from the bag. A fastener can be used to secure the seam to prevent unwanted spilling of the debris from the bag. For example, the fastener can be a hook and loop type fastener or a zipper. However, after repetitive use, especially in a harsh chemical environment, a hook and loop type fastener or a zipper can degrade and begin to fail. Further, both a hook and loop type fastener and a zipper are susceptible to failure if they are clogged by debris. Accordingly, there is a continuing need for a new securing apparatus for the debris bag.

BRIEF SUMMARY OF THE INVENTION

The following presents a simplified summary of the invention in order to provide a basic understanding of some aspects of the invention. This summary is not an extensive overview of the invention. It is intended to identify neither key nor critical elements of the invention nor delineate the scope of the invention. Its sole purpose is to present some concepts of the invention in a simplified form as a prelude to the more detailed description that is presented later.

In accordance with an aspect of the present invention, a pool cleaner debris bag is provided comprising a porous material defining an interior cavity having a closable first end and a second end adapted to attach to a pool cleaner for receiving debris from the pool ejected by a pool cleaner into the bag. The debris bag also comprises a clasp attached to the bag at the first end. The clasp has at least two separable members adapted to couple to each other while at least a portion of the first end is disposed between the at least two separable members to permit closure of the first end.

In accordance with another aspect of the present invention, a pool cleaner debris bag is provided comprising a debris bag having an open end adapted to receive debris from the pool and a closable end defining at least one discharge passage for the bag. The debris bag includes material configured to allow the passage of water therethough. The pool cleaner further comprises a securing apparatus disposed along at least a portion of the closable end. The securing apparatus has at least two separable members selectively movable between an unsecured position to permit opening of the discharge passage, and a secured position having at least a portion of the first end is disposed between the at least two separable members to permit closing of the discharge passage.

In accordance with yet another aspect of the present invention, a pool cleaner debris bag is provided comprising a porous material defining an interior cavity having an open end. The open end is adapted to attach to a pool cleaner for receiving debris from the pool ejected by a pool cleaner into the bag. The pool cleaner debris bag further comprises a seam disposed at a location spaced apart from the open end for defining at least one discharge passage for the bag. The seam includes a plurality of substantially rigid portions adapted to substantially seal the seam. The pool cleaner debris bag further comprises a securing apparatus attached to the bag at a location spaced apart from the seam. The securing apparatus is selectively movable between an unsecured configuration permitting separation of the substantially rigid portions for opening the discharge passage, and a secured configuration inhibiting separation of the substantially rigid portions for closing the discharge passage.

BRIEF DESCRIPTION OF THE DRAWINGS

The foregoing and other features and advantages of the present invention will become apparent to those skilled in the art to which the present invention relates upon reading the following description with reference to the accompanying drawings, in which:

FIG. 6 is a front view of another example element of an example securing apparatus;

FIG. 7 is a front view of yet another example element of an example securing apparatus;

DESCRIPTION OF AN EXAMPLE EMBODIMENT

Figure 1:
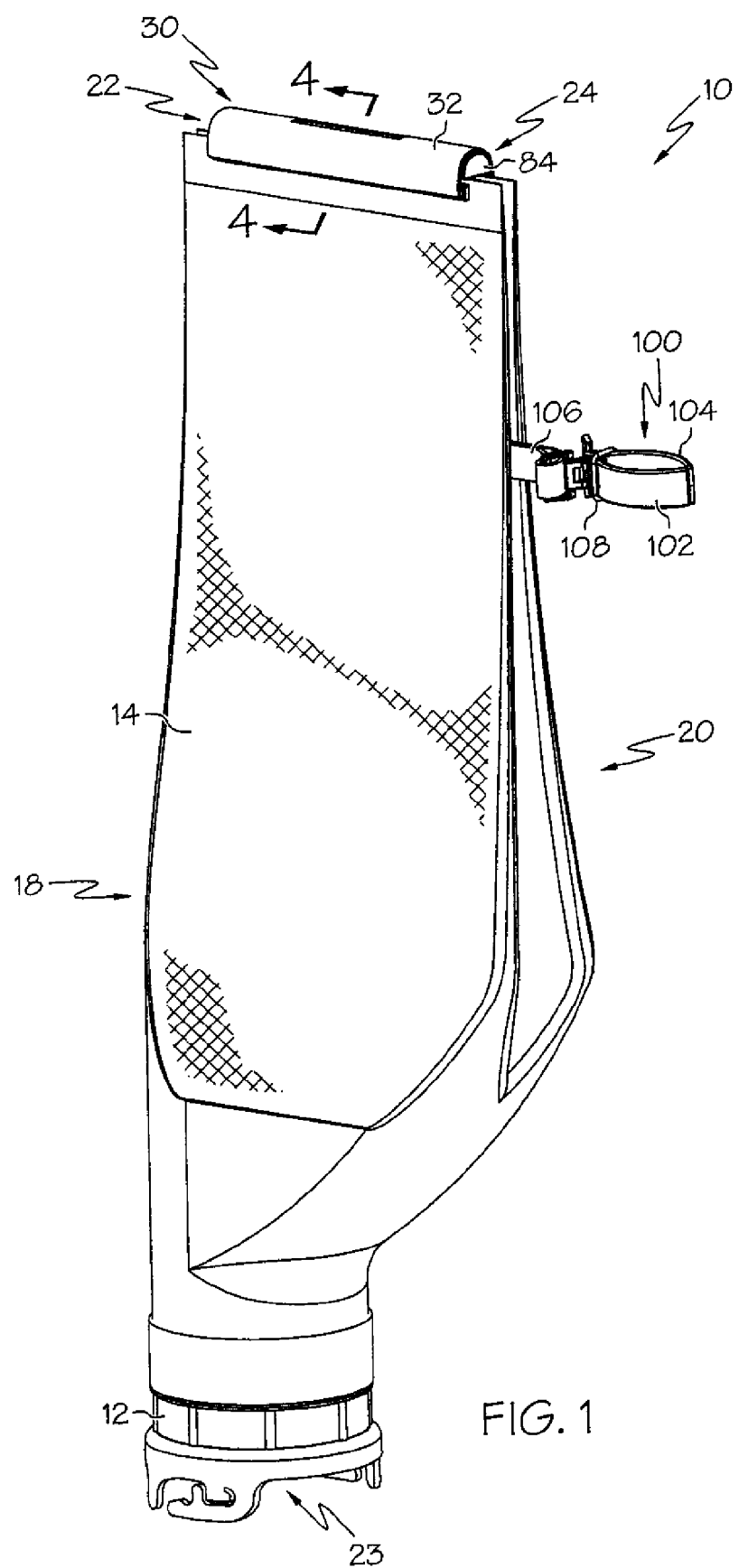
FIG. 1 is a perspective view of an example pool cleaner debris bag in a closed position.

An example embodiment of a device that incorporates aspects of the present invention is shown in the drawings. It is to be appreciated that the shown example is not intended to be a limitation on the present invention. For example, one or more aspects of the present invention can be utilized in other embodiments and even other types of devices.

Turning to the shown example of FIG. 1, a pool cleaner debris bag 10 is provided for attachment to an automatic pool cleaner (not shown). For example, the debris bag 10 can be removably attached to the automatic pool cleaner by a coupling 12 that permits easy coupling and decoupling thereof. It is to be appreciated that the shown coupling 12 is not intended to provide any limitation upon the present invention, and that any removable coupling can be used.

Figure 2:
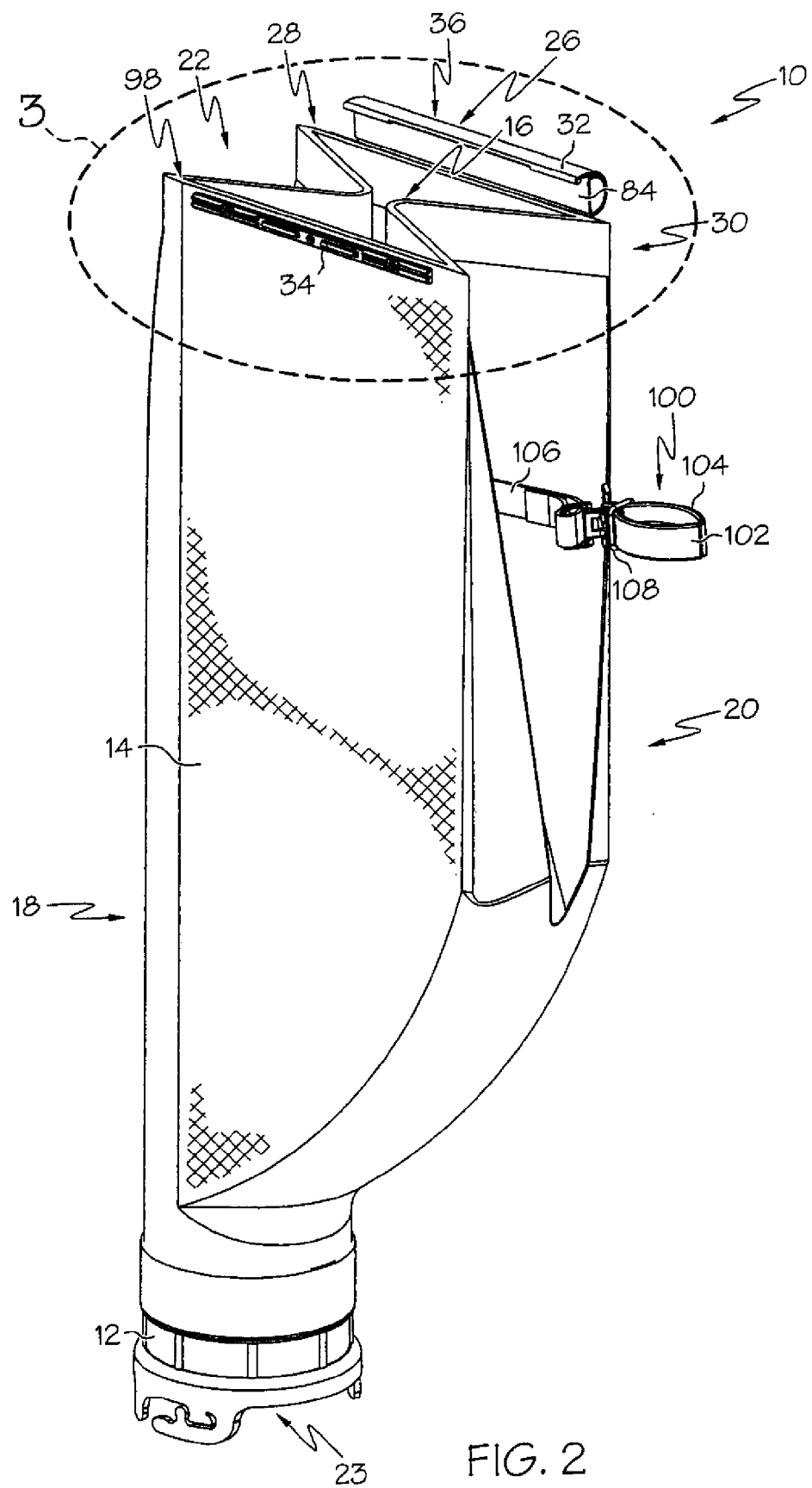
FIG. 2 is similar to FIG. 1, but shows the debris bag in an open position.

The debris bag 10 comprises a porous material 14 that defines an interior cavity 16 (see FIG. 2). The porous material 14 is configured to easily allow the passage of water or other liquids therethrough, and to inhibit the passage of most debris collected by pool cleaners. The main portion of the debris bag 10 can be constructed of a single piece of porous material 14 that can be folded along its left and right sides 18, 20 to form a substantially vertical bag.

The debris bag 10 comprises a closable first end 22. As shown, the closable first end 22 is disposed towards the top of the debris bag 10, though it is to be appreciated that the closable first end 22 can be disposed along either, or both, of the left and/or right sides 18, 20. The debris bag 10 further comprises an open, second end 23 adapted to attach to the pool cleaner for receiving debris from the pool ejected by the pool cleaner into the debris bag 10. As shown, the second end 23 is disposed towards the bottom of the debris bag 10, though it is to be appreciated the second end 23 can be disposed along either, or both, of the left and/or right sides 18, 20. The second end 23 is attached to the coupling 12 to provide fluid communication between the pool cleaner and the interior cavity 16.

In FIG. 1, the closable first end 22 is shown in a closed position 24, and in FIG. 2, the closable first end 22 is shown in an open position 26. As the pool cleaner (not shown) cleans the swimming pool, the closable first end 22 remains in the closed position 24 such that the collected debris is contained within the interior cavity 16. When it is desired to empty the debris bag 10, the closable first end 22 can be placed in the open position 26 to define a discharge passage 28 for the debris bag 10.

A securing apparatus 30 is attached to the debris bag 10 at the closable first end 22. The securing apparatus 30 can be adapted to selectively retain the first end 22 in a closed position. For example, the securing apparatus 30 can include a clasp 36. The securing apparatus 30 can be attached to the debris bag 10 in various manners, as will be discussed more fully herein.

Figure 3:
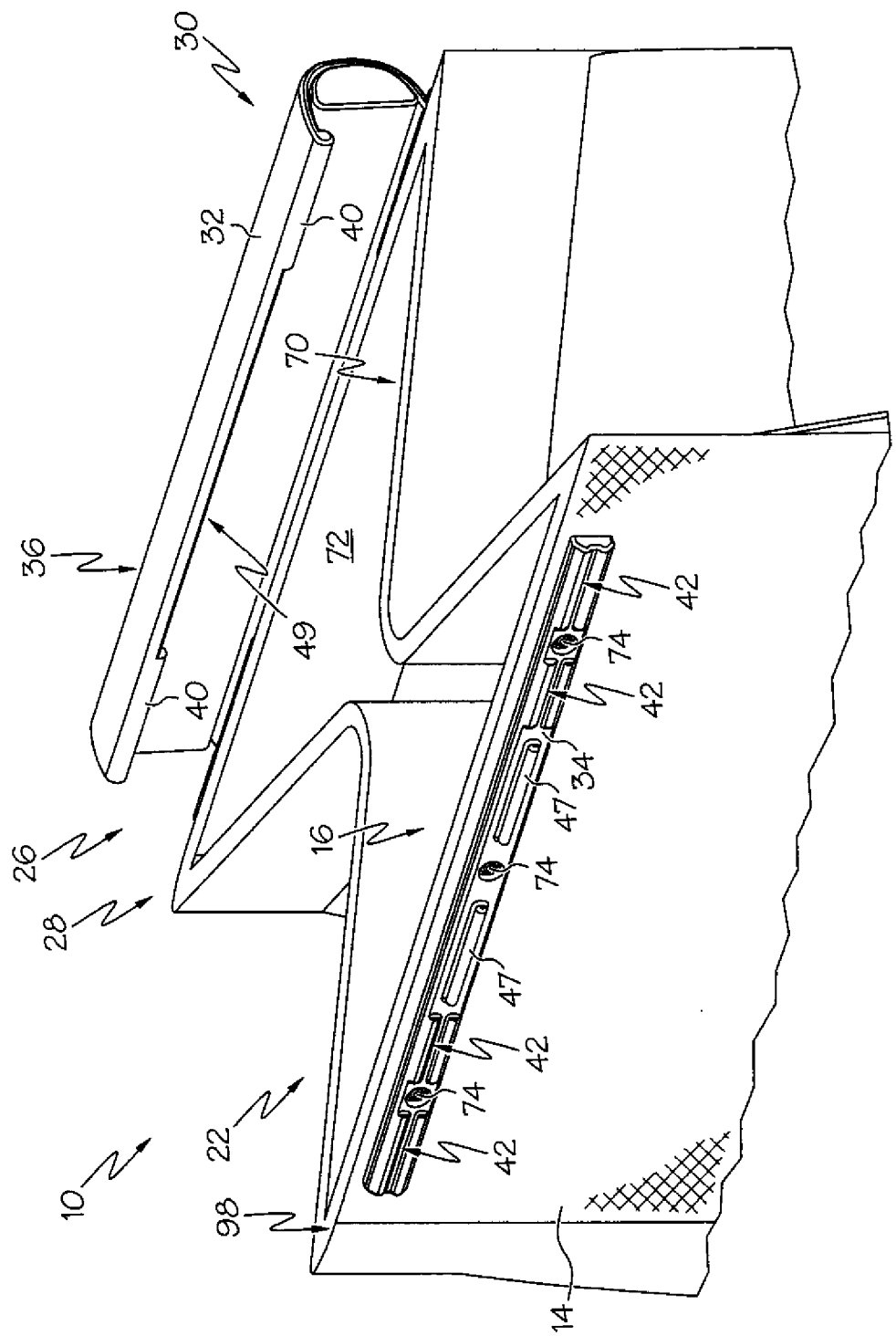
FIG. 3 is a detail view of an open end of the debris bag of FIG. 2.
Figure 4:
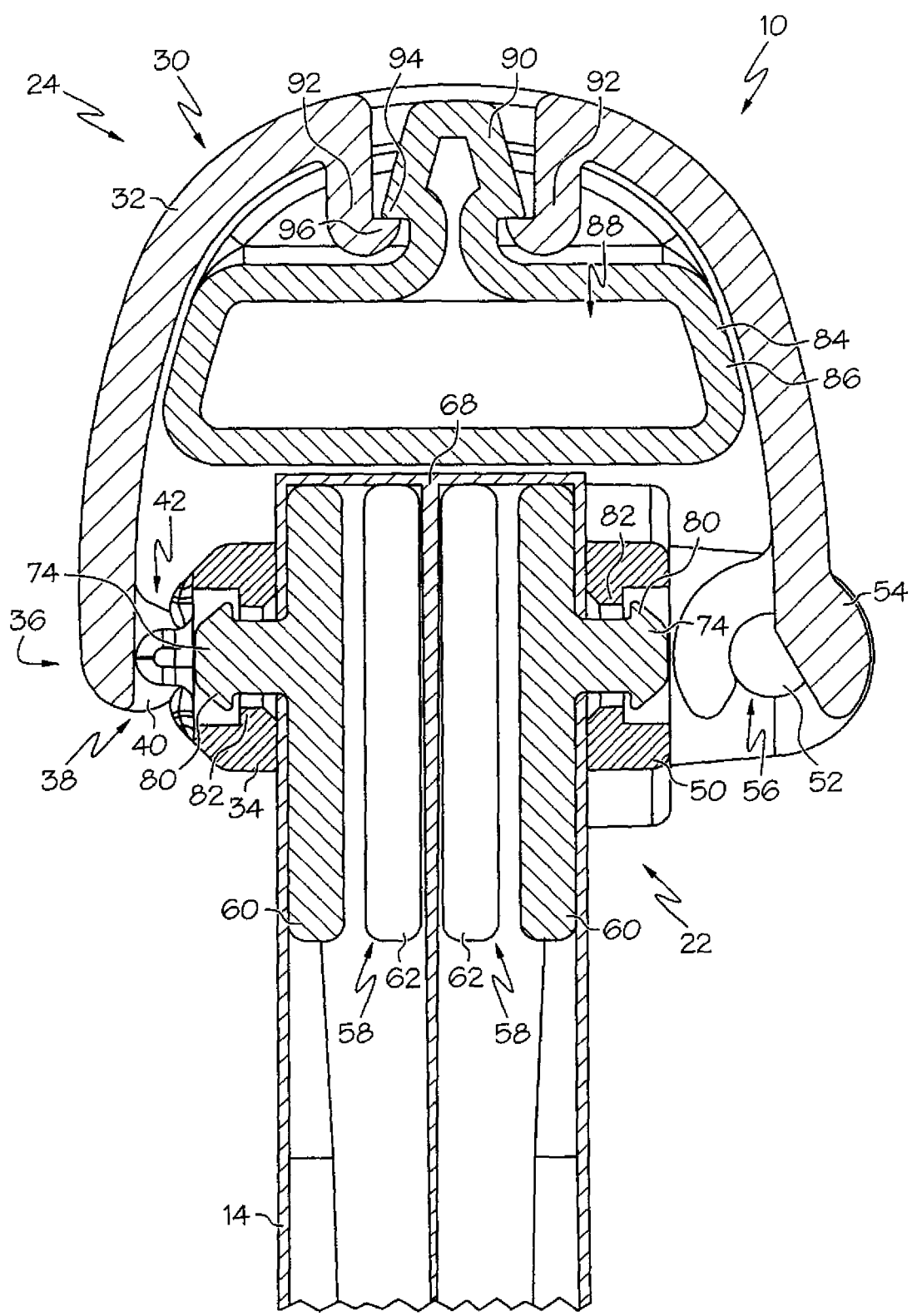
FIG. 4 is a sectional view along line 4-4 of FIG. 1.

The securing apparatus 30 includes at least two separable members adapted to couple to each other while at least a portion of the first end 22 is disposed between the at least two separable members to permit closure of the first end 22. For example, as shown in FIG. 3, the securing apparatus 30 can include a snap member 32 and a snap plate 34. As shown in FIG. 4, the at least two separable members can be adapted to form a snap fit connection 38. For example, as shown, the snap member 32 can include at least one projection 40 that is adapted to couple with a recess 42 formed in the snap plate 34. As shown, the snap member 32 includes two projections 40 disposed towards the outer ends of the snap member 32. Further, as shown, the snap plate 34 includes four corresponding recesses 42 also disposed towards the outer ends of the snap plate 34. Either, or both, of the snap member 32 and the snap plate 34 can include more or less projections 40 and/or recesses 42.

Figure 5:
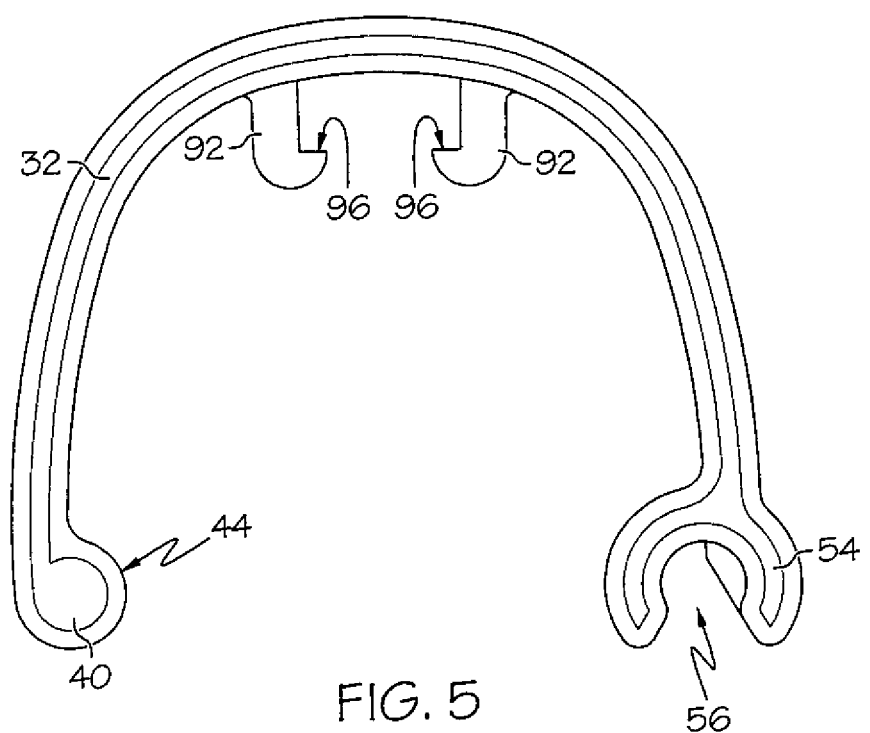
FIG. 5 is a side view of an example element of an example securing apparatus.

Turning briefly to FIG. 5, the projections 40 can include a curved, convex geometry 44 that extends outwards. Returning to FIG. 3, the recesses 42 can include a correspondingly curved, concave geometry 46 that extends inwards. As shown, the concave geometry 46 of the recesses 42 can be formed by a pair of elongated members 48 spaced apart a distance from each other. In addition or alternatively, the concave geometry 46 of the recesses 42 can be formed as a single, continuous piece.

As shown, the convex geometry 44 of the projections 40 can be slightly larger than the concave geometry 46 of the recesses 42. For example, the convex projections 40 can have a first diameter, and the concave recesses 42 can have a second, slightly smaller diameter. Thus, the projections 40 and the recesses 42 can form a snap fit connection when they are coupled. Additionally, because the projections 40 can be slightly larger than the recesses 42, the securing apparatus 30 can inhibit separation of the at least two separable members. In addition or alternatively, the snap plate 34 can further include additional support projections 47 that are adapted to abut a support surface 49 of the snap member when the securing apparatus 30 is in a closed position.

As shown in FIG. 4, the debris bag 10 can further include a hinge plate 50 attached to the debris bag 10 adjacent the first end 22. Thus, at least one of the two separable members can be pivotally attached to the debris bag 10 adjacent the first end 22. For example, the snap member 32 can be pivotally attached to the hinge plate 50. In the shown example, the hinge plate 50 includes two hinge pins 52, though any number of hinge pins 52 could be used. The snap member 32 can include corresponding hinge portions 54 having hinge pin receivers 56 adapted to receive the hinge pins 52. Thus, the snap member 32 can be pivotally connected to the hinge plate 50 such that the snap member 32 can pivot about the hinge pin 52. It is to be appreciated that other methods can be used to pivotally attach at least one of the two separable members to the debris bag 10. For example, the snap member 32 can be attached to the debris bag 10 by a resilient, flexible flap or the like (not shown) that permits a pivotable connection, such as through a living hinge.

It is to be appreciated that the foregoing description of securing apparatus 30 is not intended to provide a limitation upon the present invention. For example, the at least two separable members can be adapted to form other types of connections, such as, for example, a magnetic connection, a latched connection, a resiliently-biased clamping connection, or a buckled connection. Further still, the at least two separable members can be permanently connected to each other, such as, for example, by a strap, such that they form one continuous component having portions adapted to separate from each other. In addition, although the securing apparatus 30 as shown reaches over the top of the first end 22 to permit closure thereof, the securing apparatus 30 can also be adapted reach around the top of the first end 22 to permit closure thereof, such as may be done, for example, with a strap.

Figure 8A:
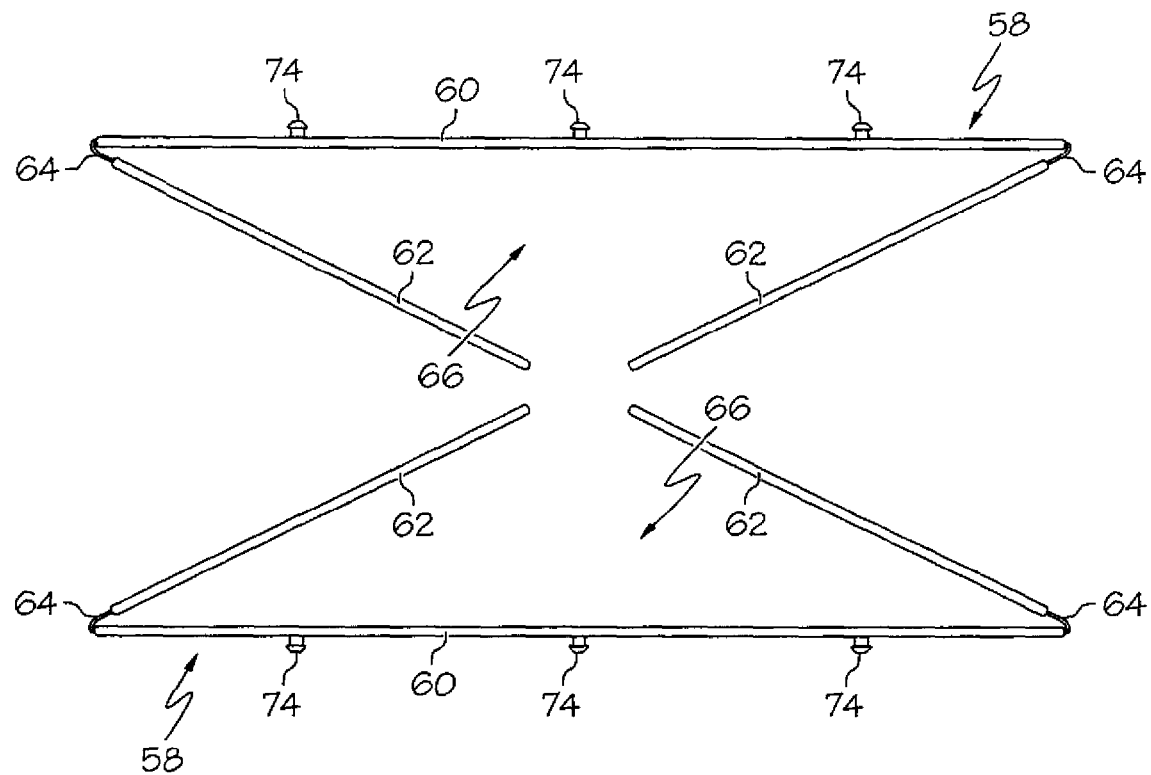
FIG. 8A is a top view of an example liner corresponding to the debris bag of FIG. 2.

Turning now to the example shown in FIG. 8A, the debris bag 10 can further comprise a substantially rigid liner 58 attached to at least a portion of the closable first end 22. For example, the substantially rigid liner 58 can include a plastic or metal material that is substantially rigid, but can have a degree of flexibility. The substantially rigid liner 58 can comprise single or multiple elements. As shown, for example, the liner 58 can include a outer edge portion 60, one or more inner edge portions 62, and one or more hinged connectors 64 adapted to connect the outer edge portion 60 to the inner edge portions 62. The hinged connector 64 can comprise any type of hinge adapted to pivotally attach the outer edge portion 60 to the inner edge portions 62. For example, as shown, the hinged connector 64 can comprise a living hinge.

Figure 8B:
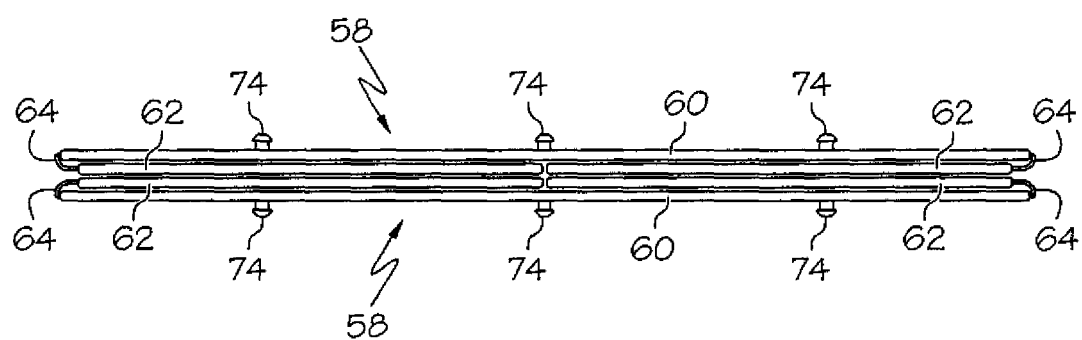
FIG. 8B is similar to FIG. 8A, but shows the example liner corresponding to the debris bag of FIG. 1.

The substantially rigid liner 58 can be adapted to move with the closable first end 22. For example, as shown in FIG. 8A, the substantially rigid liner 58 can open up to provide an opening 66 between the inner and outer edge portions 60, 62 that corresponds to the discharge passage 28 formed when the first end 22 is in an open position. Similarly, as shown in FIG. 8B, the substantially rigid liner 58 can fold up to substantially close the discharge passage 28 when the first end 22 is in a closed position. In addition or alternatively, the hinged connector 64 can be adapted to resiliently bias, as through a spring or other resilient member, the inner edge portions 62 either towards, or away from, the outer edge portion 60.

In addition or alternatively, the debris bag 10 can comprise a plurality of substantially rigid liners 60 each attached to at least a portion of the first end 22. The plurality of substantially rigid liners 60 can be adapted to cause a portion of the first end 22 to sealingly engage at least another portion of the first end 22 when the first end is in a closed position 22. For example, as shown in FIG. 4, because the substantially rigid liner 58 can fold up to substantially close the discharge passage 28, portions 68 of the first end 22 can be caught between the various outer and inner edge portions 60, 62. As such, the portions 68 of the first end 22 can sealingly engage each other to substantially seal the first end 22 when it is in a closed position. In an additional example, when the first end 22 is in moved to a closed position, the substantially rigid liner 58 (see FIGS. 8A-8B) can cause a first edge portion 70 (see FIG. 3) of the debris bag to abut a second edge portion 72 to thereby seal the first end 22. It is to be appreciated that other edge portions of the first end 22 can also abut to seal the first end 22.

As stated previously, the securing apparatus 30 can be attached to the first end 22 of the debris bag 10 in various manners. For example, the securing apparatus 30 can be adapted to attach to the substantially rigid liners 58. Returning now to the examples shown in FIGS. 8A-8B, the substantially rigid liners 58 can further include attachment members 74 adapted to provide a one-way attachment mechanism for attaching the securing apparatus 30 thereto. For example, the attachment members 74 can include pins adapted to extend through corresponding holes 76, 78 in the snap member 34 and hinge plate 50. As shown in FIG. 4, the pins 74 can each include a larger diameter shoulder 80 adapted to abut a corresponding smaller diameter shoulder 82 formed with the holes 76, 78. Thus, the pins 74 can resist removal from the holes 76, 78. It is to be appreciated that the securing apparatus 30 can be attached to the first end 22 of the debris bag 10 in other ways, such as, for example, through fasteners, stitching, adhesives, and/or welding.

The debris bag 10 can include additional components. For example, the debris bag 10 can further comprise a float 84 attached to the securing apparatus 30. During submerged operation of a pressure-side automatic pool cleaner (not shown), the debris bag 10 could topple to one side or the other and thereby obstruct the interior cavity 16. Accordingly, a float 84 can be attached to the securing apparatus 30 near the top of the debris bag 10 to ensure that the debris bag 10 remains substantially upright during submerged travel in the pool.

The float 84 can comprise any suitably buoyant configuration that has buoyancy sufficient to support the debris bag 10 during operation of the automatic pool cleaner. For example, as shown in FIG. 4, the float 84 can comprise an air-filled float having an outer shell 86 that completely surrounds and encapsulates an interior body of air 88 or other suitable gas. In addition or alternatively, the float 84 could also include a buoyant liquid or solid material, such as a closed-cell foam material. Moreover, the size of the float 84 can vary in accordance with the particular application.

Further still, the float 84 can either permanently or removably attach to the securing apparatus 30. For example, as shown in FIG. 4, the float 84 can include an attachment element 90 that cooperates with the snap member 32 to form a one-way connection. The attachment element 90 can have a tapered geometry that is adapted to fit between a pair of retaining arms 92. The attachment element 90 can also includes a pair of shoulders 94 at one end that is adapted to abut a corresponding pair of shoulders 96 disposed on the retaining arms 92. In addition or alternatively, the float 84 can attach to the securing apparatus 30 in other ways, such as, for example, through fasteners, stitching, adhesives, and/or welding.

As an additional example, the debris bag 10 can include a hose clip 100 adapted to retain at least a portion of a pool hose (not shown). For example, when the debris bag 10 is used with a pressure-side pool cleaner, the pool hose can supply pressurized water to the pool cleaner during operation thereof. Thus, the hose clip 100 can help to inhibit movement of the pool hose relative to the debris bag 10, and can also help to hold and stabilize the debris bag 10.

The hose clip 100 can include a plurality of retaining arms 102, 104 adapted to be selectively spaced a distance from each other. The hose clip 100 can include resilient means 108 for resiliently biasing the retaining arms 102, 104 towards each other. For example, the resilient means 108 can include an elastomeric member, such a resilient ring. Further, because the retaining arms 102, 104 can be resiliently biased towards each other, the hose clip 100 can be adapted to automatically adjust the distance between the retaining arms to accommodate various pool hoses having various sizes (i.e., various outer diameters). For example, the hose clip 100 can be adapted to accommodate various pool hoses having various diameters within the range of a minimum diameter to a maximum diameter at least 50% larger than the minimum diameter. Additionally, a means 106 for connecting can connect the hose clip 100 to the debris bag 10. As shown in FIG. 1, the means 106 for connecting can be a line, strap, or the like attached between the debris bag 10 and the hose clip 100. In addition or alternatively, the means 106 for connecting can form a loop that passes through a hole (not shown) in the hose clip 100 to restrain it. It is to be appreciated that the foregoing description of the hose clip 100 is not intended to provide a limitation upon the present invention, and that the hose clip 100 can include various other elements.

In accordance with another aspect of the present invention, the securing apparatus 30 can be disposed along at least a portion of the closable first end 22 and have at least two separable members. The at least two separable members can be selectively movable between an unsecured position to permit opening of the discharge passage 28 and a secured position having at least a portion of the first end 22 disposed between the at least two separable members to permit closing of the discharge passage 28. For example, as shown in FIG. 3, the securing apparatus 30 can include a snap member 32 that is adapted to couple to a snap plate 34 to form a snap fit connection. The securing apparatus 30 can be in an unsecured position as shown in FIG. 3 to permit opening of the discharge passage 28 to thereby permit access to the interior cavity 16. In the shown example of FIG. 1, the securing apparatus 30 can be in a secured position. As discussed previously herein, the substantially rigid liner 58 (see FIGS. 8A-8B) can cause the first edge portion 70 of the debris bag to abut the second edge portion 72 to thereby seal the discharge passage 28. It is to be appreciated that this aspect of the invention can also include any of the features of the invention as previously discussed herein, including, but not limited to, the at least two separable members, the substantially rigid liners, the float, and the hose clip.

In accordance with yet another aspect of the present invention, the debris bag 10 can comprise a seam 98 disposed at a location spaced apart from the open end 23 for defining the discharge passage 28. Thus, the discharge passage 28 is spaced apart from the open end 23. The seam 98 can include a plurality of substantially rigid portions adapted to substantially seal the seam 98. For example, the seam 98 can include a plurality of substantially rigid liners 58 as discussed previously. In addition or alternatively, the seam 98 could include other elements that provide a substantially rigid function. The securing apparatus 30 can be attached to the debris bag 10 at a location spaced apart from the seam 98. For example, as shown in FIG. 3, the snap plate 34 can be attached to the substantially rigid liners 58. The securing apparatus 30 can be selectively movable between an unsecured configuration permitting separation of the substantially rigid portions for opening the discharge passage 28, as shown in FIG. 2, and a secured configuration inhibiting separation of the substantially rigid portions for closing the discharge passage, as shown in FIG. 1. Further still, the substantially rigid portions can be adapted to substantially seal the seam 98 when the discharge passage 28 is closed. For example, the substantially rigid portions can cause a first edge portion 70 of the debris bag to abut a second edge portion 72 to thereby seal the seam 98. It is to be appreciated that this aspect of the invention can also include any of the features of the invention as previously discussed herein, including, but not limited to, the at least two separable members, the substantially rigid liners, the float, and the hose clip.

The invention has been described with reference to various example embodiments. Obviously, modifications and alterations will occur to others upon a reading and understanding of this specification. It is intended to include all such modifications and alterations insofar as they come within the scope of the appended claims or the equivalents thereof.

The invention claimed is:

1. A pool cleaner debris bag, comprising:
a debris bag having an open end adapted to receive debris from the pool and a closable end defining at least one discharge passage for the bag, the discharge passage including more than one first edge portion and two opposing second edge portions, wherein the debris bag comprises a porous material configured to allow the passage of water therethrough; and
a securing apparatus attached to and disposed along at least a portion of the closable end and having two separable members, where a first separable member and a second separable member of the two separable members are each disposed on one of the second edge portions of the discharge passage, the securing apparatus is selectively movable between an unsecured position to permit opening of the discharge passage and a secured position having at least a portion of the closable end disposed between the first separable member and the second separable member to permit closing of the discharge passage, wherein the portion of the closeable end disposed between the first separable member and the second separable member in the secured position comprises porous material, and the more than one first edge portion is adjacent to and between the two second edge portions when the securing apparatus is in a secured position, and one of the two separable members reaches over a top of the closable end when the securing apparatus is in the secured position.

2. The pool cleaner debris bag of claim 1, wherein the securing apparatus comprises a clasp.

3. The pool cleaner debris bag of claim 1, wherein at least one of the two separable members is pivotally attached to the bag adjacent the closable end.

4. The pool cleaner debris bag of claim 1, wherein the two separable members are adapted to form a snap fit connection.

5. The pool cleaner debris bag of claim 1, further comprising a substantially rigid liner attached to at least a portion of the closable end of the bag.

6. The pool cleaner debris bag of claim 1, further comprising a plurality of substantially rigid liners each attached to at least a portion of the closable end, wherein the plurality of substantially rigid liners are adapted to cause a portion of the closable end to sealingly engage at least another portion of the closable end when the closable end is closed.

7. The pool cleaner debris bag of claim 6, wherein the portions of the closable end that sealingly engage comprise porous material.

8. The pool cleaner debris bag of claim 1, further comprising a float attached to the securing apparatus.

* * * * *